US008671716B2

(12) United States Patent
Sudo et al.

(10) Patent No.: US 8,671,716 B2
(45) Date of Patent: Mar. 18, 2014

(54) METHOD OF MANUFACTURING VITREOUS SILICA CRUCIBLE

(75) Inventors: Toshiaki Sudo, Akita (JP); Takuma Yoshioka, Akita (JP)

(73) Assignee: Japan Super Quartz Corporation, Akita-shi (JP)

( * ) Notice: Subject to any disclaimer, the term of this patent is extended or adjusted under 35 U.S.C. 154(b) by 195 days.

(21) Appl. No.: 13/308,328

(22) Filed: Nov. 30, 2011

(65) Prior Publication Data

US 2012/0137735 A1 Jun. 7, 2012

(30) Foreign Application Priority Data

Dec. 3, 2010 (JP) ................................. 2010-270478

(51) Int. Cl.
*C03B 19/09* (2006.01)
(52) U.S. Cl.
USPC ................. 65/17.4; 65/17.3; 65/17.6; 65/144
(58) Field of Classification Search
None
See application file for complete search history.

(56) References Cited

U.S. PATENT DOCUMENTS

2010/0107691 A1* 5/2010 Sato et al. ....................... 65/17.6
2010/0139549 A1* 6/2010 Sakurada et al. ............... 117/13

FOREIGN PATENT DOCUMENTS

| EP | 2181969 A1 | 5/2010 |
| JP | 01-160836 A | 6/1989 |
| JP | 2001-002430 A | 1/2001 |
| JP | 2001-328831 A | 11/2001 |

OTHER PUBLICATIONS

Extended European Search Report mailed Jun. 6, 2012, issued in corresponding European Application No. EP11191165, filed Nov. 29, 2011, 6 pages.

* cited by examiner

*Primary Examiner* — Matthew Daniels
*Assistant Examiner* — Lisa Herring
(74) *Attorney, Agent, or Firm* — Christensen O'Connor Johnson Kindness PLLC (57) ABSTRACT

There is provided a method of manufacturing a vitreous silica crucible having non-bubbles on the inner surface without necessitating new apparatuses for grinding and polishing and without damaging the productivity. According to the present invention, there is provided a method of manufacturing a vitreous silica crucible including the processes of: gathering a vitreous silica layer containing residual bubbles existing in a near-surface region of the transparent layer of the vitreous silica crucible by controlling the number of rotations applied to the vitreous silica crucible in a state that an inner surface side of the vitreous silica crucible is fused by arc heating; and moving a portion of a non-bubble layer in the surface of the transparent layer exposed by movement of the residual bubble-containing layer to cover a region in which bubbles have gathered with the non-bubble layer.

3 Claims, 4 Drawing Sheets

METHOD OF MANUFACTURING VITREOUS SILICA CRUCIBLE

CROSS-REFERENCE TO RELATED APPLICATION

This application is related to Japanese Patent Application No. 2010-270478 filed on Dec. 3, 2010, whose priority is claimed and the disclosure of which is incorporated by reference in its entirety.

BACKGROUND OF THE INVENTION

1. Field of the Invention

The present invention relates to a method of manufacturing a vitreous silica crucible.

2. Description of the Related Art

Single crystal silicon is usually manufactured by the Czochralski method (the CZ method). According to this method, a seed crystal is dipped into silicon melt in a vitreous silica crucible, and the seed crystal is gradually pulled up to manufacture single crystal silicon. For this method, a high-purity vitreous silica crucible is used to keep silicon melted.

The vitreous silica crucible used for pulling single crystal silicon is primarily manufactured by use of the fusing method by arc heating. In this method, silica raw material powder is supplied onto the inner surface of a rotating mold made of carbon, and the silica raw material powder is fused by arc heating by electrodes provided above the inner surface side of the mold, to manufacture a vitreous silica crucible. This way, there is obtained a vitreous silica crucible having a transparent layer hardly containing bubbles on the inner surface side of the vitreous silica crucible. However, because some bubbles remain on the surface of the transparent layer, when the transparent layer is corroded from the surface by silicon melt, the bubbles can expand or be cleaved to expose the transparent layer to the interface with silicon melt. As a result, during pulling of a silicon single crystal, the single crystallization becomes unstable, and the single crystallization yield can drop.

As the countermeasure, for example, JP-A-h01-160836 discloses a method of manufacturing a vitreous silica crucible by fusing silica raw material powder by arc fusing while depressurizing a silica powder molded body by suctioning the silica powder molded body from the mold side. In the vitreous silica crucible made by this method, the bubble content ratio in the transparent layer is drastically decreased, and thickness of the transparent layer can be thickened.

Furthermore, JP-A-2001-002430 discloses a method of supplying silica raw material powder onto the inside of a rotating mold to form a crucible-shaped molded body followed by arc heating to obtain a vitreous silica crucible, and thereafter grinding the entire inner surface of the vitreous silica crucible, and then arc heating the entire inner surface after the grinding, to completely remove bubbles in the surface of a transparent layer of the vitreous silica crucible. Furthermore, JP-A-2001-328831 discloses a method of polishing the entire inner surface of a vitreous silica crucible, and heat treating the polished surface by use of an oxyhydrogen burner, to completely remove bubbles in the surface of the vitreous silica crucible.

SUMMARY OF THE INVENTION

However, the prior art described in the above-mentioned was not necessarily satisfactory.

First, according to the technique as described in JP-A-h01-160836, air was introduced into a crucible via the inner surface of the crucible by the vacuum suction, and thus it was difficult to completely remove bubbles. When bubbles remain in the surface of the transparent layer, there still occurs a problem that the single crystallization yield deteriorates by the expansion or cleavage of the bubbles as mentioned before.

Second, according to the technique as described in JP-A-2001-002430 and JP-A-2001-328831, a grinding or polishing process is essential, and thus a new facility for the grinding and polishing is necessitated, and time and effort are required for these processes, and thus the productivity drops. Furthermore, there can occur a problem that impurities can be mixed into vitreous silica when grinding or polishing is carried out.

The present invention has been made in view of these circumstances, and provides a method of manufacturing a vitreous silica crucible having non-bubbles on the inner surface without necessitating new apparatuses for grinding and polishing and without damaging the productivity.

According to the present invention, provided is a method of manufacturing a vitreous silica crucible comprising the processes of: supplying silica raw material powder into a rotating mold to form a crucible-shaped molded body; arc heating the crucible-shaped molded body while rotating the crucible-shaped molded body and depressurizing from an inner surface toward an outer surface the crucible-shaped molded body to form a cylindrical vitreous silica crucible having a bottom portion and a wall portion extending from the bottom portion and the crucible having a transparent layer on an inner surface side and a bubble-containing layer on an outer surface side; gathering a vitreous silica layer containing residual bubbles existing in a near-surface region of the transparent layer of the vitreous silica crucible by controlling the number of rotations applied to the vitreous silica crucible in a state that an inner surface side of the vitreous silica crucible is fused by arc heating; and moving a portion of a non-bubble layer in the surface of the transparent layer exposed by movement of the vitreous silica layer containing residual bubbles to cover a region in which bubbles have gathered with the non-bubble layer.

According to the method, the residual bubble-containing layer existing in a near-surface region of the transparent layer of the vitreous silica crucible is gathered in the transparent layer of the radially outward side of the bottom portion, and thereafter the region in which bubbles have gathered is covered with the non-bubble layer. Therefore, no new apparatus for grinding and polishing is necessary.

According to this method, the process for grinding or polishing is not necessary, and thus it is possible to manufacture a vitreous silica crucible containing no bubble in the inner surface without damaging the productivity.

BRIEF DESCRIPTION OF THE DRAWINGS

FIG. 1 (a) to FIG. 1 (e) are views showing a manufacturing process of a vitreous silica crucible of the present embodiment.

DESCRIPTION OF THE PREFERRED EMBODIMENTS

Hereinafter, embodiments of the present invention are explained with reference to drawings. In all drawings, corresponding components are given corresponding reference symbols, and the detailed explanation is not repeated.

Method of Manufacturing of the Present Embodiment

Figure 1A:
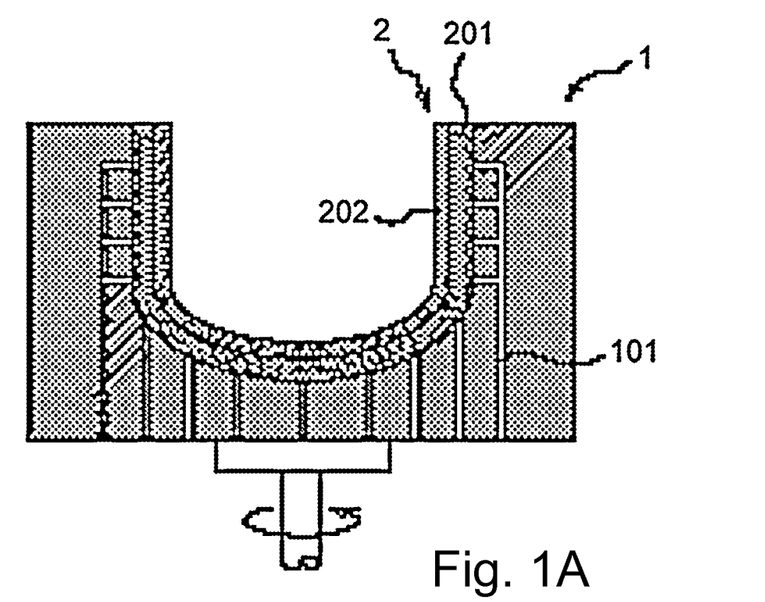
Figure 1B:
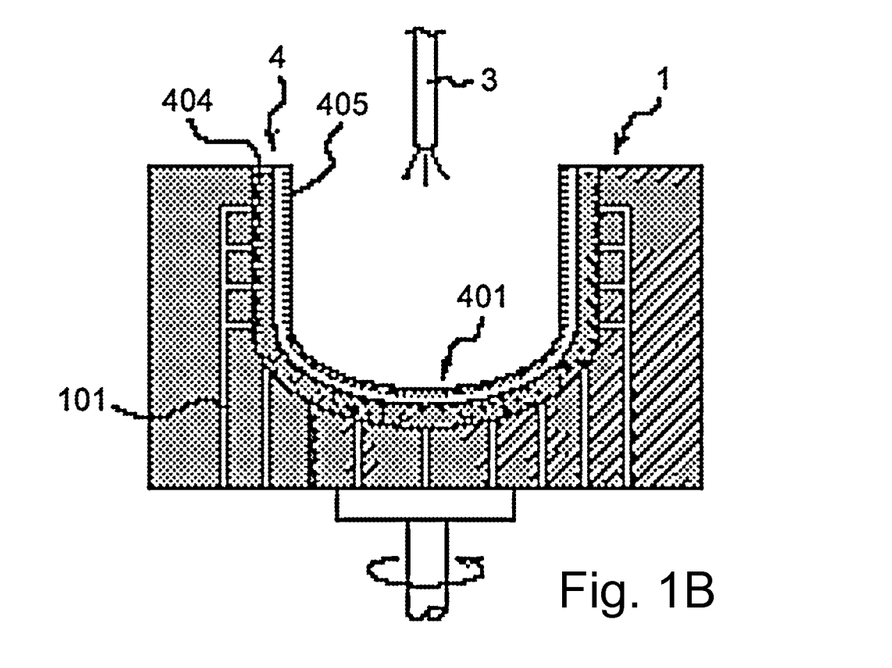

FIG. 1 (a) to FIG. 1 (e) are sectional views in the radial direction of the crucible, showing a manufacturing process of a vitreous silica crucible of the present embodiment. The sectional view in the radial direction of the crucible refers to a view of a plane including the central axis line of the crucible. FIG. 2 is a partial sectional view of a wall of a vitreous silica crucible manufactured according to the present embodiment.

In the figures, reference symbol 1 denotes a mold for molding a crucible, reference symbol 101 denotes a ventilation hole provided in the mold 1, reference symbol 2 denotes a crucible-shaped molded body formed by supplying silica raw material powder into the mold 1, reference symbol 201 denotes an outer layer of the crucible-shaped molded body 2, reference symbol 202 denotes an inner layer of the crucible-shaped molded body 2, reference symbol 3 denotes an arc electrode for arc fusing silica raw material powder or a crucible, reference symbol 4 denotes a vitreous silica crucible, reference symbol 401 denotes a bottom portion of the crucible 4, reference symbol 402 denotes a wall portion extending from the bottom portion and having an opening on the opposite side to the bottom portion, reference symbol 403 denotes a corner portion connecting the bottom portion 401 and the wall portion 402, reference symbol 404 denotes a bubble-containing layer of the crucible 4 (hereinafter, a vitreous silica layer containing bubbles is referred to as "bubble-containing layer," but a residual bubble-containing layer, to be described later, is not the "bubble-containing layer"), and reference symbol 405 denotes a transparent layer of the crucible 4 (hereinafter, a transparent vitreous silica layer is referred to as "transparent layer").

Hereinafter, an example of a process for manufacturing a vitreous silica crucible 4 according to the present embodiment will be explained. First, as shown in FIG. 1(a), natural silica powder is supplied into a rotating mold 1 to form an outer layer 201, and then synthetic silica powder is supplied onto the outer layer 201 to form an inner layer 202, to form a crucible-shaped molded body 2 having the outer layer 201 and the inner layer 202.

Next, as shown in FIG. 1 (b), the crucible-shaped molded body 2 is arc heated from the inner surface side by use of arc electrodes 3 to fuse the crucible-shaped molded body 2 in its entirety, to manufacture a vitreous silica crucible 4. During the arc heating, the crucible-shaped molded body is depressurized from the mold 1 side via ventilation holes 101 provided in the mold 1 to form a transparent layer 405 containing a scarce amount of bubbles on the surface and the inside of the inner layer 202.

The arc heating temperature is preferred to be 1800 degrees C. or more and 2600 degrees C. or less, and more preferred to be 2000 degrees C. or more and 2400 degrees C. or less. When the transparent layer 405 is formed, the pressure of the depressurization is preferred to be −50 kPa or more and less than −95 kPa. When synthetic silica powder is fused under such strong depressurization, the bubbles contained therein are immediately removed to form a transparent layer 405 having a low bubble content (i.e., having a bubble content rate of less than 0.5%). Furthermore, after forming the transparent layer 405, the pressure of the depressurization is adjusted to 0 kPa or more and less than −10 kPa to form a bubble-containing layer 404 having a bubble content rate of 0.5% or more and less than 50% on the outer side of the transparent layer 405. In the present specification, the bubble content rate refers to the ratio (W2/W1) of the volume (W2) occupied by bubbles in a unit volume (W1) of the crucible. Furthermore, in the present specification, the value of the pressure is the value with reference to the ambient air pressure.

By arc heating, a transparent layer 405 on the inner surface side and a bubble-containing layer 404 on the outer surface side are formed. In another aspect, a synthetic vitreous silica layer made of synthetic vitreous silica is formed on the inner surface side, and a natural vitreous silica layer made of natural vitreous silica is formed on the outer surface side. Synthetic vitreous silica is vitreous silica obtained by fusing and solidifying chemically synthesized amorphous or crystalline silica (silicon oxide) powder. Synthetic vitreous silica has very low impurity concentration. Silica powder to form synthetic vitreous silica (synthetic silica powder) can be manufactured by chemical synthesis such as gas phase oxidation (dry synthesis) of silicon tetrachloride ($SiCl_4$), or hydrolysis (sol-gel method) of silicon alkoxide ($Si(OR)_4$). Natural vitreous silica is vitreous silica obtained by fusing and solidifying silica powder obtained from natural mineral whose main component is α-quartz. Silica powder to form natural vitreous silica (natural silica powder) can be manufactured by pulverizing natural mineral whose main component is α-quartz.

Figure 1C:
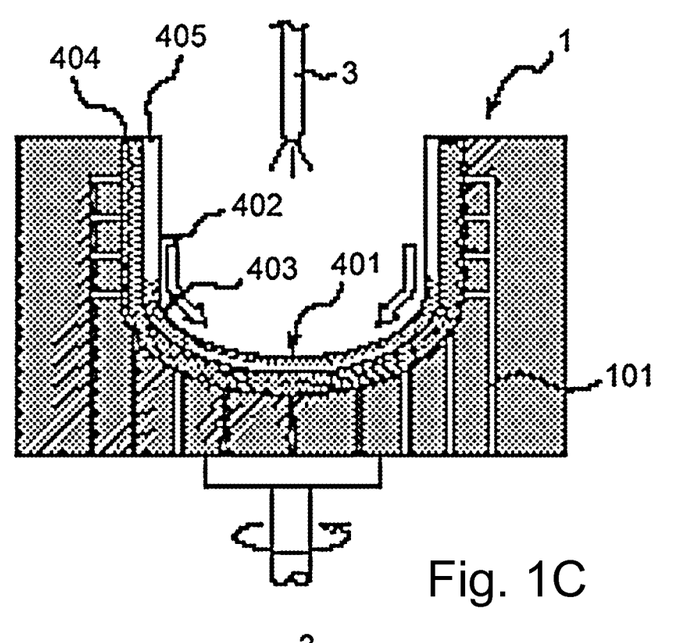
Figure 2:
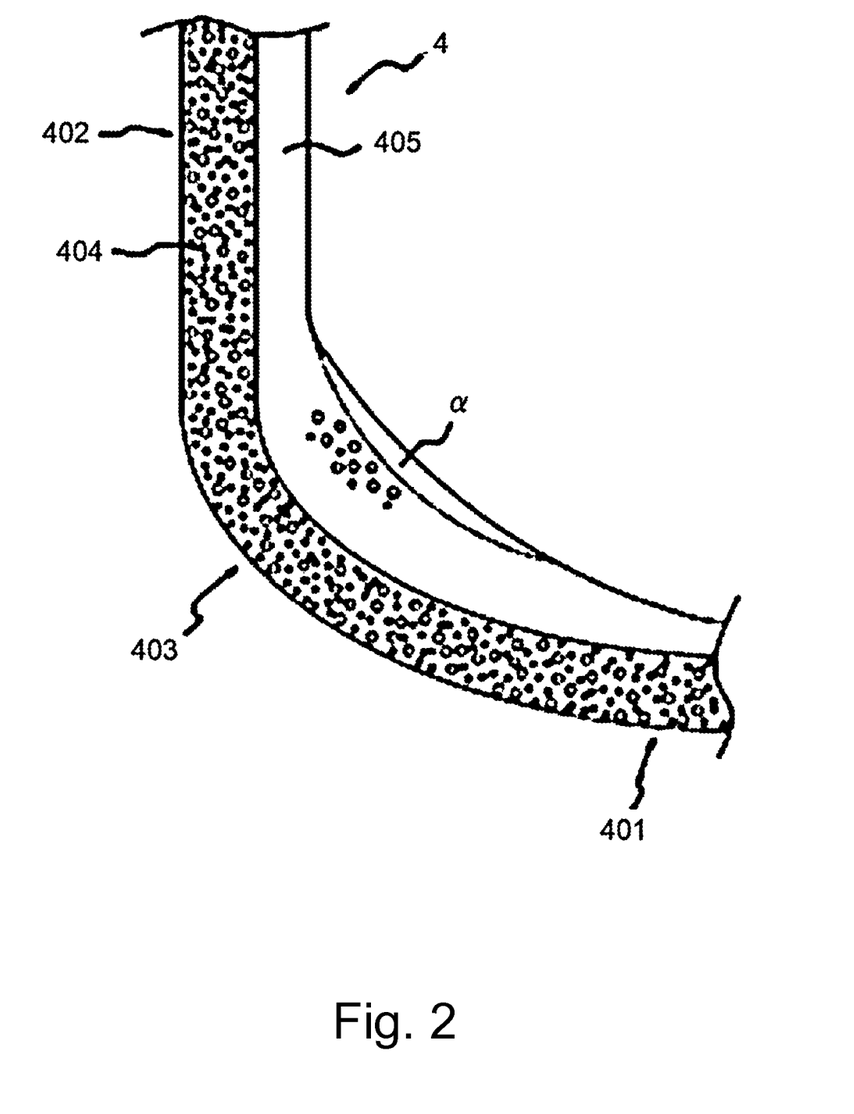
FIG. 2 is a partial sectional view of a wall of a vitreous silica crucible manufactured according to the present embodiment.

Here, in order to further remove residual bubbles existing in the transparent layer 405 and on the surface of the transparent layer 405 (the near-surface region, of the transparent layer 405, containing these bubbles is referred to as "residual bubble-containing layer"), first, as shown in FIG. 1(c), the number of rotations applied to the crucible 4 is controlled to adjust the acceleration applied to the crucible 4 to be 13 m/s$^2$ or less in a state that the wall portion 402 of the vitreous silica crucible 4 is fused from the inner surface side by the arc electrodes 3. As a result, because the number of rotations of the vitreous silica crucible 4 is small and the centrifugal force is weak, and thus the residual bubble-containing layer in the near-surface region of the wall portion 402, in a state fused by the arc heating, moves toward the bottom portion 402 due to the gravity, and gathers in the corner portion 403 (bottom direction moving process). By the bottom direction moving process, in the wall portion 402 other than the corner portion 403, the transparent layer 405 becomes a non-bubble layer because the residual bubble-containing layer moves and the non-bubble layer existing thereunder is exposed.

Here, in the bottom direction moving process, it is preferred that the number of rotations applied to the vitreous silica crucible 4 is controlled to adjust the acceleration applied to the vitreous silica crucible 4 to be 13 m/s$^2$ or less. When the acceleration in the bottom direction moving process is 13 m/s$^2$ or less, the centrifugal force applied to the wall portion 402 is small, and thus the residual bubble-containing layer moves toward the bottom portion 401 by the gravity and gathers sufficiently in the corner portion 403. The acceleration can be 12 m/s$^2$ or less, 11 m/s$^2$ or less, or 10 m/s$^2$ or less. The smaller the acceleration is, the smaller the centrifugal force applied to the wall portion 402 is. On the other hand, the acceleration is preferred to be 6 m/s$^2$ or more, 7 m/s$^2$ or more, or 8 m/s$^2$ or more. When the acceleration is too small, the large portion of the transparent layer 405 of the wall portion 402 can move toward the bottom portion 401 by the gravity.

Figure 1D:
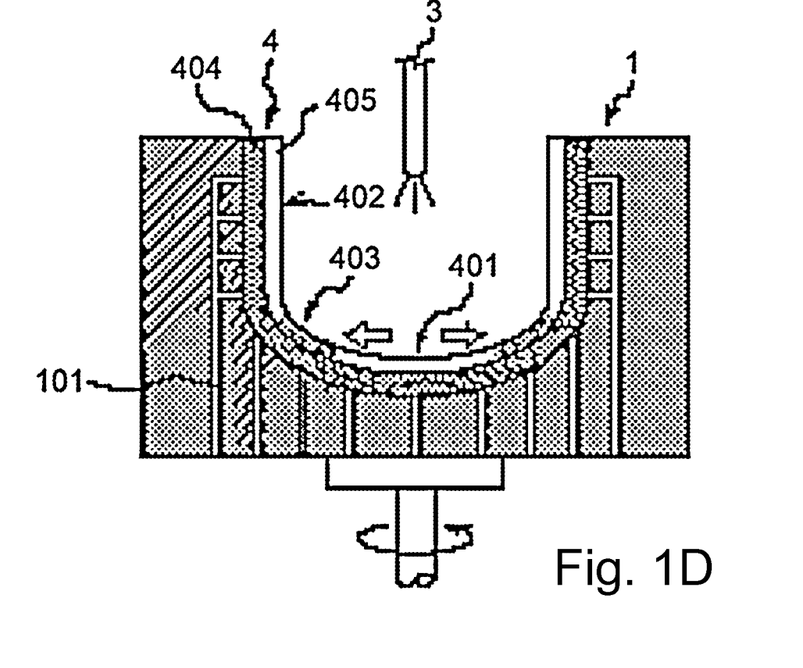

Thereafter, as shown in FIG. 1(d), the number of rotations applied to the crucible 4 is controlled to adjust the acceleration applied to the crucible 4 to be 17 m/s$^2$ or more in a state that the bottom portion 401 of the vitreous silica crucible 4 is fused from the inner surface side by the arc electrodes 3. As a result, because the number of rotations of the vitreous silica crucible 4 is large and the centrifugal force is strong, and thus the residual bubble-containing layer in the near-surface region of the bottom portion 401, in a state fused by the arc heating, moves radially outward of the bottom portion 401, and gathers in the corner portion 403 (radially outward direction moving process). By the radially outward direction moving process, in the bottom portion 401 other than the corner portion 403, the transparent layer 405 becomes a non-bubble layer because the residual bubble-containing layer moves and the non-bubble layer existing thereunder is exposed.

By the aforementioned bottom direction moving process and radially outward direction moving process, all of the residual bubbles existing in the near-surface region of the transparent layer 405 of the vitreous silica crucible 405 gathers in the corner portion 403. The bubbles rarely move individually, and usually move together with the near-surface region of the fused transparent layer 405. The order of carrying out the processes of FIGS. 1(*c*) and 1(*d*) does not influence the effect of the present embodiment, and thus either of the processes of FIGS. 1(*c*) and 1(*d*) can be carried out first.

Furthermore, in the radially outward direction moving process, it is preferred that the number of rotations applied to the vitreous silica crucible 4 is controlled to adjust the acceleration applied to the vitreous silica crucible 4 to be 17 m/s$^2$ or more. When the acceleration in the radially outward direction moving process is 13 m/s$^2$ or more, the centrifugal force applied to the bottom portion 401 is sufficiently large, and thus the residual bubble-containing layer moves radially outward, and gathers sufficiently in the corner portion 403. The acceleration can be 18 m/s$^2$ or more, 19 m/s$^2$ or more, or 20 m/s$^2$ or more. The larger the acceleration is, the larger the centrifugal force applied to the bottom portion 401 is. On the other hand, the acceleration is preferred to be 40 m/s2 or less, 35 m/s2 or less, or 30 m/s2 or less. When the acceleration is too large, the large portion of the non-bubble layer under the residual bubble-containing layer can moves radially outward, and thus the transparent layer 405 of the bottom portion 401 can be too thin.

The thickness of the residual bubble-containing layer is not in particular limited, and can change depending on conditions of depressurization, but, in many cases, is 1 mm or less from the inner side surface of the transparent layer 405, and for example, 0.9 mm, 0.8 mm, 0.7 mm, 0.6 mm, 0.5 mm, 0.4 mm, 0.3 mm, 0.2 mm, or 0.1 mm or less. Naturally, the thickness of the residual bubble-containing layer is 0.0 mm or more. In any case, in fusing, by use of arc heating, a residual bubble-containing layer, it is preferred that the fusing thickness is large enough to be larger than the thickness of the residual bubble-containing layer. However, in view of the maintenance of the quality and the strength of the transparent layer 405 of the vitreous silica crucible 4, it is not preferred to fuse the layer more deeply than necessary.

A non-bubble layer is exposed after the residual bubble-containing layer is moved. The non-bubble layer does not necessarily mean a layer containing completely no bubbles. However, the bubble content ratio of the non-bubble layer needs to be lower than that of the residual bubble-containing layer. Specifically, the bubble content ratio of the non-bubble layer is preferred to be 0.3% or less, 0.2% or less, or 0.1% or less. Naturally, the bubble content ratio of the non-bubble layer is 0.0% or more. In order to suppress the expansion or cleavage of the bubbles in pulling of single crystal silicon, the bubble content ratio of the non-bubble layer is preferred to be as small as possible.

After both of the processes, as shown in FIG. 1(*e*), the number of rotations applied to the crucible 4 is controlled to adjust the acceleration applied to the crucible 4 to be 12 m/s$^2$ or more and 20 m/s$^2$ or less in a state that the bottom portion 401 of the vitreous silica crucible 4 is fused from the inner surface side by the arc electrodes 3. As a result, the number of rotations of the vitreous silica crucible 4 is in an appropriate range and the centrifugal force is also in an appropriate range, and thus the non-bubble layer exposed on the inner surface side of the bottom portion 401 sufficiently moves, in a state fused by the arc heating, radially outward of the bottom portion 401, but there does not occur a problem that too much of the non-bubble layer moves and the transparent layer 405 in the bottom portion 401 becomes too thin. As a result, the corner portion 403 in which the residual bubble-containing layer has gathered is covered by the non-bubble layer (covering process). FIG. 2 shows the state that the corner portion 403 is covered with the non-bubble layer (reference symbol a denotes a portion of the non-bubble layer moved from the bottom portion 401).

Figure 1E:
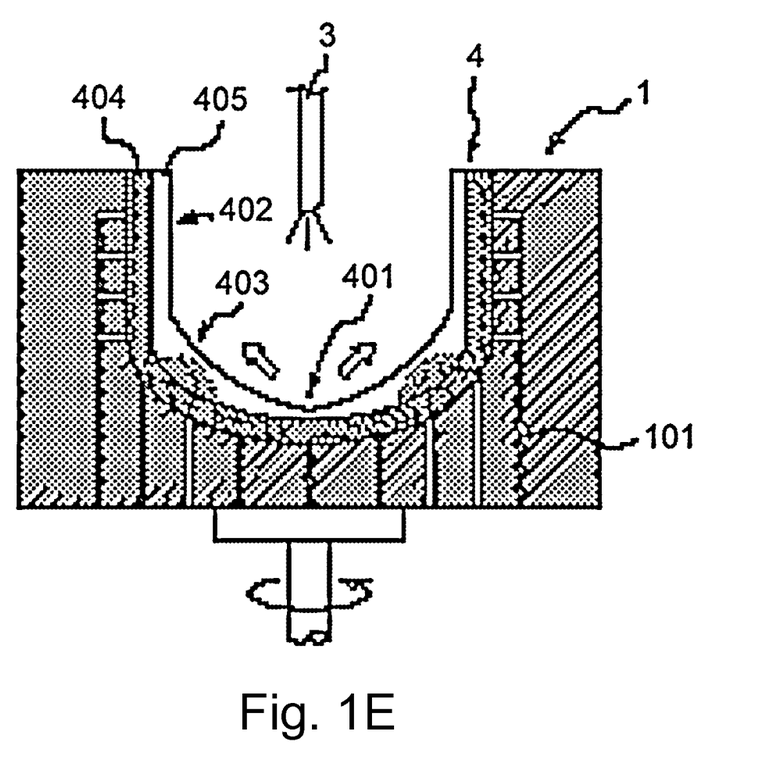

Here, in the covering process, in order to move the non-bubble layer with an appropriate centrifugal force, it is preferred that the number of rotations applied to the vitreous silica crucible 4 is controlled to adjust the acceleration applied to the vitreous silica crucible 4 to be 12 m/s$^2$ or more and 20 m/s$^2$ or less. Furthermore, the acceleration may be any of 12 m/s$^2$ or more, 13 m/s$^2$ or more, 14 m/s$^2$ or more, and 15 m/s$^2$ or more, and may be any of 20 m/s$^2$ or less, 19 m/s$^2$ or less, 18 m/s$^2$ or less, or 17 m/s$^2$ or less. When the acceleration is in such range, the centrifugal force is within an appropriate range, and thus the non-bubble layer moves, in a state fused by the arc heating, radially outward, but does not move upward along the wall portion 402.

In these processes of moving bubbles (bottom direction moving process, radially outward direction moving process, and covering process), in fusing the bottom portion 401 or the wall portion 402 by arc heating, the arc heating temperature is preferred to be set to 1800 to 2600 degrees C., and more preferred to be set to 2000 to 2400 degrees C. When the arc heating temperature is 1800 degrees C. or more or 2000 degrees C. or more, the viscosity of the heated region is small, and thus the residual bubble-containing layer (e.g., having a thickness of 0.5 to 1 mm) is easy to move, and thus time for gathering bubbles is shortened. As a result, the productivity of the vitreous silica crucible 4 improves. Furthermore, when the arc heating temperature is 2600 degrees C. or less or 2400 degrees C. or less, the viscosity of vitreous silica is not too small, and thus vitreous silica is not too easy to move, and thus the shape of the vitreous silica crucible can be easily controlled. Furthermore, the increase in cost to use high temperature and the increase of the amount of evaporation of vitreous silica can be suppressed.

The relationship among the acceleration applied to the vitreous silica crucible 4, the outer diameter of the vitreous silica crucible 4, and the number of rotations is shown in Table 1. For the crucibles having an outer diameter of 25 inches (635 mm), 32 inches (813 mm) and 37 inches (940 mm), the number of rotations that provide an acceleration of 12 m/s$^2$, 16 m/s$^2$ or 20 m/s$^2$ is shown in Table 1.

TABLE 1

|  | 12 m/s$^2$ | 16 m/s$^2$ | 20 m/s$^2$ |
| --- | --- | --- | --- |
| 25 inches | 59 rpm | 68 rpm | 76 rpm |
| 32 inches | 52 rpm | 60 rpm | 67 rpm |
| 37 inches | 48 rpm | 56 rpm | 62 rpm |

Operation and Effect of the Present Embodiment

In the present embodiment, first, as shown in FIG. 1(*a*), silica raw material powder is supplied into a rotating mold 1 to form a crucible-shaped molded body 2. Next, as shown in FIG. 1(b), the crucible-shaped molded body 2 is arc heated while rotating the crucible-shaped molded body and depressurizing from an inner surface toward an outer surface the crucible-shaped molded body to form a cylindrical vitreous silica crucible 4 having a bottom portion 401 and a wall portion 402 extending from the bottom portion and the crucible having a transparent layer 405 on an inner surface side and a bubble-containing layer 404 on an outer surface side Next, as shown in FIG. 1(c) and FIG. 1(d), the number of rotations applied to the vitreous silica crucible 4 is controlled in a state that the inner surface side of the vitreous silica crucible 4 is fused by arc heating so that a residual bubble-containing layer in the surface of the transparent layer 405 of the vitreous silica crucible 4 gathers in a transparent layer 405 residing in the radially outward of the bottom portion 401.

Then, as shown in FIG. 1(e), the number of rotations applied to the vitreous silica crucible 4 is controlled in a state that the inner surface side of the vitreous silica crucible 4 is fused by arc heating so that a portion of a non-bubble layer exposed by movement of the residual bubble-containing layer is moved radially outward of the bottom portion 401 to cover the region in which bubbles has gathered.

Thus, according to the present embodiment, as shown in FIG. 2, the residual bubble-containing layer in the surface of the transparent layer 405 of the vitreous silica crucible 4 is gathered in the transparent layer 405 of the radially outward of the bottom portion 401, and then the region in which bubbles have gathered is covered by moving a non-bubble layer exposed by movement of the residual bubble-containing layer. Therefore, a new apparatus for grinding and polishing to remove the region in which bubbles have gathered is not necessary.

Furthermore, in the present embodiment, a grinding or polishing process to remove the region in which bubbles has gathered is not necessary, and thus it is possible to manufacture a vitreous silica crucible 4 having a non-bubble layer on the inner surface without damaging the productivity. In other words, a crucible 4 can be manufactured without carrying out a grinding or polishing process for the transparent layer 405, and thus the productivity does not drop. In addition, an apparatus for grinding and polishing is not necessary, and existing facilities can be used, and thus increase of manufacturing cost can be suppressed.

Furthermore, a silicon single crystal can be pulled by use of the crucible 4, which is manufactured by gathering bubbles in the corner portion 403 by the bottom direction moving process and the radially outward direction moving process and not covering the corner portion 403 with a non-bubble layer. In this case, expansion and cleavage of bubbles are suppressed in the transparent layer 405 in the wall portion and the bottom portion, from which bubbles are removed, even when the transparent layer 405 is corroded from the surface by silicon melt.

However, according to the aforementioned method, there are many bubbles in the surface (in particular, in the near-surface region) of the corner portion 403, and thus when the corner portion 403 is corroded from the surface with silicon melt, expansion or cleavage of the bubbles occurs and bubbles are exposed to the interface with the silicon melt, which leads to drop in the single crystallization yield. In contrast, according to the present embodiment, the corner portion 403 is covered with a non-bubble layer, and thus the entire inner surface of the vitreous silica crucible 4 contains no bubbles. Therefore, even when the inner surface of the crucible 4 is corroded with silicon melt, expansion or cleavage of the bubbles does not occur, and thus silicon single crystal can be obtained in high yield.

Furthermore, in the present embodiment, the thickness of the corner portion 403 increases, and thus there is another advantage that buckling of the crucible 4 can be suppressed in pulling a single crystal. In this case, the thickness of transparent layer 405 of the bottom portion 401 decreases, and thus the transparent layer 405 of the bottom portion 401 is preferred to have a larger thickness in view of the reduction of the transparent layer 405. For example, the thickness of the transparent layer 405 of the bottom portion 401 before the radially outward direction moving process and the covering process is preferred to be 2.0 mm or more, 3.0 mm or more, or 4.0 mm or more. In this case, the thickness of the transparent layer 405 of the bottom portion 401 can be 1.0 mm or more, 1.5 mm or more, or 2.0 mm or more even after the radially outward direction moving process and the covering process. The thickness of the transparent layer 405 before the movement of the non-bubble layer is usually 20 mm or less in view of constraints in design and manufacturing.

Up to here, embodiments of the present invention have been explained with reference to drawings. However, these are just examples of the present invention, and other various configurations can be employed.

For example, in the above-mentioned embodiment, as shown in FIG. 1(e), the non-bubble layer in the inner surface side of the bottom portion 401 is moved radially outward of the bottom portion 401, and the corner portion 403 where bubbles have gathered is covered with the non-bubble layer. However, the present invention is not in particular limited to such embodiment. For example, instead of moving, radially outward, the non-bubble layer of the inner surface side of the bottom portion 401, it is possible to move the non-bubble layer of the inner surface side of the wall portion 402 toward the bottom portion so as to cover the corner portion 403 with the non-bubble layer moved from the wall portion 402. Furthermore, it is also possible to, in addition to moving, radially outward, the non-bubble layer of the inner surface side of the bottom portion 401, move the non-bubble layer of the inner surface side of the wall portion 402 toward the bottom portion so as to doubly cover the corner portion 403 with the non-bubble layer moved from the bottom portion 401 and the wall portion 402.

Furthermore, in the above-mentioned embodiment, when the crucible-shaped molded body 2 is arc heated, the crucible-shaped molded body 2 is depressurized. However, the process of depressurization is an optional process. In other words, the crucible-shaped molded body 2 can be arc heated without depressurization. It is preferred to depressurize the crucible-shaped molded body so as to reduce, as much as possible, the residual bubble-containing layer in the surface of the transparent layer 405 of the vitreous silica crucible 4.

Example

Hereinafter, the present invention will be explained with reference to Examples. The present invention is not limited by these Examples.

In the following experiment, a vitreous silica crucible manufactured by a conventional technique (Conventional Crucible), a vitreous silica crucible manufactured by the same method as Example (described below) except that the process of moving the non-bubble layer of the bottom portion to the corner portion is not included (Comparative Example Crucible), and a vitreous silica crucible manufactured by the manufacturing method of the aforementioned embodiment were formed, and they were subjected to evaluation.

<Conventional Crucible>

A method of manufacturing a conventional crucible will be explained below. First, natural silica powder was supplied into a mold having an outer diameter of 32 inches (813 mm), which was rotating at 60 rpm (acceleration: 16 m/s$^2$) to form an outer layer, and then synthetic silica powder was supplied on the outer layer to form an inner layer. Thereafter, the resultant crucible-shaped molded body having the outer layer and the inner layer was fused by arc heating at 2000 degrees C. by use of a three-phase alternating current arc fusing apparatus while rotating the mold at 60 rpm (acceleration: 16 m/s$^2$). During fusing, the crucible-shaped molded body was depressurized via ventilation holes of the mold for the first two minutes from the start of the fusing, and thereafter the depressurization was terminated to form a vitreous silica crucible having a transparent layer of a thickness of 4 mm and a bubble-containing layer of a thickness of 15 mm. Then, after the fusing, the vitreous silica crucible was cooled, and taken out of the apparatus.

Comparative Example

A method of manufacturing a Comparative Example crucible will be explained. First, natural silica powder was supplied into a mold having an outer diameter of 32 inches (813 mm), which was rotating at 60 rpm (acceleration: 16 m/s$^2$) to form an outer layer, and then synthetic silica powder was supplied on the outer layer to form an inner layer. Thereafter, the resultant crucible-shaped molded body having the outer layer and the inner layer was fused by arc heating at 2000 degrees C. by use of a three-phase alternating current arc fusing apparatus while rotating the mold at 60 rpm. During fusing, the crucible-shaped molded body was depressurized via ventilation holes of the mold for the first two minutes from the start of the fusing, and thereafter the depressurization was terminated to form a vitreous silica crucible having a transparent layer of a thickness of 4 mm and a bubble-containing layer of a thickness of 15 mm.

Thereafter, the number of rotations was decreased to 52 rpm (acceleration: 12 m/s$^2$), and the crucible was arc heated at 2200 degrees C. for 30 seconds to move the bubbles in the wall portion of the vitreous silica crucible toward the bottom portion, to gather the bubbles in the corner portion. Next, the number of rotations was increased to 67 rpm (20 m/s$^2$), and the crucible was arc heated at 2200 degrees C. for 30 seconds to move, radially outward, the bubbles in the bottom portion of the vitreous silica crucible to gather the bubbles in the corner portion. Then, after the fusing, the vitreous silica crucible was cooled, and taken out of the apparatus.

Example

A method of manufacturing an Example crucible will be explained. First, natural silica powder was supplied into a mold having an outer diameter of 32 inches (813 mm), which was rotating at 60 rpm (acceleration: 16 m/s$^2$) to form an outer layer, and then synthetic silica powder was supplied on the outer layer to form an inner layer. Thereafter, the resultant crucible-shaped molded body having the outer layer and the inner layer was fused by arc heating at 2000 degrees C. by use of a three-phase alternating current arc fusing apparatus while rotating the mold at 60 rpm. During fusing, the crucible-shaped molded body was depressurized via ventilation holes of the mold for the first two minutes from the start of the fusing, and thereafter the depressurization was terminated to form a vitreous silica crucible having a transparent layer of a thickness of 4 mm and a bubble-containing layer of a thickness of 15 mm.

Thereafter, the number of rotations was decreased to 52 rpm (acceleration: 12 m/s$^2$), and the crucible was arc heated at 2200 degrees C. for 30 seconds to move the bubbles in the wall portion of the vitreous silica crucible toward the bottom portion, to gather the bubbles in the corner portion. Next, the number of rotations was increased to 67 rpm (20 m/s$^2$), and the crucible was arc heated at 2200 degrees C. for 30 seconds to move, radially outward, the bubbles in the bottom portion of the vitreous silica crucible to gather the bubbles in the corner portion. Furthermore, while keeping the number of rotations to be 67 rpm (acceleration: 16 m/s$^2$), the crucible was arc heated at 2200 degrees C. for 30 seconds to move, radially outward, the non-bubble layer of the bottom portion of the vitreous silica crucible in order to cover the corner portion in which the bubbles had gathered. Finally, after the fusing, the vitreous silica crucible was cooled, and taken out of the apparatus.

<Analysis and Evaluation>

For the aforementioned crucibles, the bubble content ratio at a depth of 1 mm from the inner surface in the portion near the opening of the wall portion, in the corner portion, and in the center of the bottom portion was measured. The result is shown in Table 2. Here, the portion near the opening means the portion 20 mm below the opening, and the corner portion means a portion connecting the bottom portion and the wall portion and having the smallest curvature.

TABLE 2

|  | Conventional Crucible | Comp. Ex. Crucible | Ex. Crucible |
| --- | --- | --- | --- |
| Near Opening | 1.2 | <0.1 | <0.1 |
| Corner Portion | 0.5 | 0.8 | <0.1 |
| Center of Bottom Portion | 0.1 | <0.1 | <0.1 |

As apparent from the result of Table 2, compared with the conventional crucible, the bubble content ratio of the Comparative Example crucible was lower in the portion near the opening of the wall portion and the center of the bottom portion, and was higher in the corner portion. Furthermore, compared with the Comparative Example crucible, the bubble content ratio of the Example crucible was lower in any of the portion near the opening of the wall portion, the corner portion and the center of the bottom portion. Furthermore, a silicon single crystal was pulled in the same conditions by use of the conventional crucible, the Comparative Example crucible, or the Example crucible. As the result, compared with the conventional crucible and the Comparative Example crucible, a silicon single crystal was obtained in high yield by use of the Example crucible (data not shown).

<Analysis of Result>

The aforementioned experimental result shows that because the Example crucible was obtained by gathering the residual bubble-containing layer in the corner portion through the bottom direction moving process and the radially outward direction moving process, and covering the corner portion with a non-bubble layer, and thus the entire inner surface of the Example crucible contains no bubbles, a silicon single crystal was obtained in high yield by use of the Example crucible compared with the conventional crucible and the Comparative Example crucible.

Thus, the present invention has been explained with reference to Example. Those skilled in the art would appreciate that this Example is for illustration purpose only, and various modifications are possible, and those modifications are within the scope of the present invention.

| EXPLANATION OF REFERENCE SYMBOL | |
|---|---|
| 1 | Mold |
| 2 | Crucible-Shaped Molded Body |
| 3 | Arc Electrode |
| 4 | Vitreous Silica Crucible |
| 101 | Ventilation Hole |
| 201 | Outer Layer |
| 202 | Inner Layer |
| 401 | Bottom Portion |
| 402 | Wall Portion |
| 403 | Corner Portion |
| 404 | Bubble-Containing Layer |
| 405 | Transparent Layer |

What is claimed is:

1. A method of manufacturing a vitreous silica crucible comprising the processes of:
   (1) supplying silica raw material powder into a rotating mold to form a crucible-shaped molded body;
   (2) arc heating the crucible-shaped molded body while rotating the crucible-shaped molded body and depressurizing from an inner surface toward an outer surface the crucible-shaped molded body to form a cylindrical vitreous silica crucible having a bottom portion and a wall portion extending from the bottom portion and the crucible having a transparent layer on an inner surface side and a bubble-containing layer on an outer surface side;
   (3) gathering a vitreous silica layer containing residual bubbles existing in a near-surface region of the transparent layer of the vitreous silica crucible by controlling the number of rotations applied to the vitreous silica crucible in a state that an inner surface side of the vitreous silica crucible is fused by arc heating; and
   (4) moving a portion of a non-bubble layer in the surface of the transparent layer exposed by movement of the vitreous silica layer containing residual bubbles to cover a region in which bubbles have gathered with the non-bubble layer;
   wherein the process (3) of gathering a vitreous silica layer comprises the processes of:
      (A) moving, toward the bottom portion, a vitreous silica layer containing residual bubbles existing in a surface of the transparent layer of the wall portion by controlling the number of rotations applied to the vitreous silica crucible in a state that an inner surface side of the wall portion is fused by arc heating;
      (B) moving, radially outward, a vitreous silica layer containing residual bubbles existing in a surface of the transparent layer of the bottom portion by controlling the number of rotations applied to the vitreous silica crucible in a state that an inner surface side of the bottom portion is fused by arc heating;
   wherein the process (A) comprises the process of controlling the number of rotations to adjust the acceleration in the wall portion to be 13 m/s$^2$ or less,
   wherein the process (B) comprises the process of controlling the number of rotations to adjust the acceleration in the wall portion to be 17 m/s$^2$ or more, and
   wherein the process (4) comprises the process of controlling the number of rotations to adjust the acceleration in the wall portion to be 12 m/s$^2$ or more and 20 m/s$^2$ or less.

2. The method of claim 1, wherein the arc heating in the processes (2) to (4) is carried out at 1800 to 2600 degrees C.

3. The method of claim 1, wherein the process (1) comprises the processes of:
   supplying natural silica powder into the rotating mold to form an outer layer, and
   supplying synthetic silica powder on the outer layer to form an inner layer.

* * * * *